United States Patent
Reynoso Gomez

(10) Patent No.: US 7,592,056 B2
(45) Date of Patent: Sep. 22, 2009

(54) COMPOSITION COMPRISING IONOMER AND POLYAMIDE

(75) Inventor: Sara Luisa Reynoso Gomez, Mexico City (MX)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/585,496

(22) Filed: Oct. 24, 2006

(65) Prior Publication Data

US 2008/0097047 A1  Apr. 24, 2008

(51) Int. Cl.
*B29D 22/00* (2006.01)
*C08K 5/41* (2006.01)
*C08K 5/541* (2006.01)
*C08K 3/20* (2006.01)
*C08K 3/38* (2006.01)

(52) U.S. Cl. ............... 428/35.7; 524/405; 524/423; 524/424; 524/425; 524/427; 524/430; 524/436; 524/437; 524/497

(58) Field of Classification Search ........... 524/405, 524/423, 424, 425, 427, 430, 436, 437, 497; 428/35.7

See application file for complete search history.

(56) References Cited

U.S. PATENT DOCUMENTS

| | | | |
|---|---|---|---|
| 5,091,478 | A | 2/1992 | Saltman |
| 5,587,430 | A | 12/1996 | Talkowski |
| 5,700,890 | A | 12/1997 | Chou |
| 5,859,137 | A | 1/1999 | Chou |
| 5,866,658 | A | 2/1999 | Talkowski |
| 5,902,869 | A | 5/1999 | Chou |
| 6,399,684 | B1 | 6/2002 | Talkowski |
| 2002/0004555 | A1 | 1/2002 | Di-Benedetto |
| 2002/0013413 | A1* | 1/2002 | Bellinger et al. ............ 525/179 |

FOREIGN PATENT DOCUMENTS

WO  00/78409 A1  12/2000

OTHER PUBLICATIONS

PCT International Search Report for International application No. PCT/US2007/022266, dated Apr. 29, 2008.

* cited by examiner

*Primary Examiner*—Ana L Woodward

(57) ABSTRACT

Disclosed is a composition comprising an ionomer and a polyamide wherein the ionomer is preferably dispersed in a continuous or co-continuous polyamide phase. Also disclosed is an article such as a cosmetics container produced from the composition.

20 Claims, No Drawings

COMPOSITION COMPRISING IONOMER AND POLYAMIDE

This invention relates to a composition comprising polyamide and ionomer and product therewith.

BACKGROUND OF THE INVENTION

The cosmetics industry has been using a blend of ABS (acrylonitrile, butadiene, and styrene) and SAN (styrene acrylonitrile) to produce plastic articles such as containers, make-up covers and lip gloss tubes. The exterior of the plastic article desires high gloss, good weatherability, good impact resistance, good thermal properties and high mar & scratch resistance. It is also desirable to pre-compound all components such that, when applied, they appear to have been produced from a single, homogenous component. Success in incorporating metallic colors has been limited and paint adherence to the resin is less satisfactory because ABS/SAN blend lacks suitable high temperature properties. Also less than desirable is mar resistance of the surface of the ABS/SAN article. Certain blends of ionomers with polyamides are known in the art. See, e.g., U.S. Pat. Nos. 5,091,478, 5,587,430, 5,700,890, 5,859,137, 5,866,658, 5,902,869, and 6,399,684 as well as US patent application 2002/0004555. There is a need for a resin composition having better mechanical properties.

SUMMARY OF THE INVENTION

The invention provides a composition and an article wherein the composition comprises or is produced from an ionomer and polyamide and the article such as container comprises or is produced from the composition.

DETAILED DESCRIPTION OF THE INVENTION

The composition can comprise ionomer in the range of from about 1 to about 30%, about 10 to about 25%, or about 15 to about 25% such as about 20% of an ionomer and about 70 to about 99%, about 75 to about 90%, or about 75 to about 85% such as about 80% of a polyamide, based on the total weight of the composition.

An ionomer can comprise repeat units derived from an ethylene acid copolymer by at least partial neutralization of the carboxylic acid groups with a metal ion including alkali metal, transition metal, alkaline earth metal, or combinations of two or more thereof. The neutralization can be from about 10 to about 100%, about 30 to about 90%, or $\geq 60\%$, $\geq 80\%$, $\geq 90\%$, or even 100%. Examples of metals include lithium, sodium, potassium, magnesium, calcium, zinc, or combinations of two or more thereof. Metal compounds can include formates, acetates, nitrates, carbonates, hydrogencarbonates, oxides, hydroxides, alkoxides of the metal ions, or combinations of two or more thereof.

An acid copolymer can comprise repeat units derived from ethylene, an $\alpha,\beta$-unsaturated $C_3$-$C_8$ carboxylic acid, and optionally a comonomer. Preferred $\alpha,\beta$-unsaturated $C_3$-$C_8$ carboxylic acids include acrylic acid, methacrylic acid, or combinations thereof.

The comonomer can be present from about 3 to about 25 weight % including an ethylenically unsaturated dicarboxylic acid such as maleic anhydride, ethyl hydrogen maleate, itaconic acid, CO, glycidyl (meth)acrylic acid or its alkyl ester, or combinations of two or more thereof.

For example, acid copolymer can be described as E/X/Y copolymers where E is ethylene, X is the $\alpha,\beta$-ethylenically unsaturated carboxylic acid, and Y is the comonomer. X can be present in 3 to 30 (or 4 to 25, or 5 to 20) weight % of the polymer, and Y can be present in 0 to 30 (or 0 to 25) weight % of the polymer. Specific acid copolymers can include ethylene/(meth)acrylic acid copolymer, ethylene/(meth)acrylic acid/n-butyl (meth)acrylate copolymer, ethylene/(meth) acrylic acid/iso-butyl (meth)acrylate copolymer, ethylene/(meth)acrylic acid/methyl (meth)acrylate copolymer, ethylene/(meth)acrylic acid/ethyl(meth)acrylate copolymer, or combinations of two or more thereof.

Methods of preparing such ionomers are well known. See, e.g., U.S. Pat. Nos. 3,264,272, 4,351,931, and 5,028,674, the disclosures of which are incorporated herein by reference and the description of the methods is omitted for the interest of brevity. An example of commercial ionomer is Surlyn® available from E. I. du Pont de Nemours and Company (DuPont).

Two or more ionomers can be blended and used as the ionomer component. For example, a blend of about 10 to about 40 weight % of zinc-neutralized ionomer and about 60 to about 90 weight % of sodium-neutralized ionomer can be used to produce a final composition, for example, comprising about 80% polyamide, 15% sodium-neutralized ionomer, and 5% zinc-neutralized ionomer, all by weight.

Polyamide can include aliphatic polyamides such as polyamide 6, polyamide 9, polyamide 10, polyamide 11, polyamide 12, polyamide 6,6, polyamide 6,6/6, polyamide 6,9, polyamide 6,10, and polyamide 6,12 and polyamides prepared from 2,2-bis-(p-aminocyclohexyl)propane; and aromatic or partially aromatic polyamides such as polyamide 6I, polyamide 6T, polyamide 6I,6T, polyamides prepared from terephthalic acid and/or isophthalic acid and trimethylhexamethylenediamine as well as those prepared from adipic acid, azelaic acid, from terephthalic acid and 4,4'-diaminocyclohexylmethane, and polyamide MXD6 (comprising m-xylylenediamine and adipic moieties); and copolymers thereof. Frequently used polyamide is polyamide 6 (nylon 6).

Mixtures and/or copolymers of two or more of the foregoing polyamides or pre-polymers thereof, respectively, are also within the scope disclosed herein.

Polyamides may be made by any known method, including the polymerization of a monoamino monocarboxylic acid or a lactam thereof having at least two carbon atoms between the amino group and carboxylic acid group, of substantially equimolar proportions of a diamine which contains at least two carbon atoms between the amino groups and a dicarboxylic acid, or of a monoaminocarboxylic acid or a lactam thereof as define above, together with substantially equimolar portions of a diamine and a dicarboxylic acid. This dicarboxylic acid may be used in the form of a functional derivative thereof, for example, a salt, an ester or acid chloride.

Polyamides and polyamide precursors are disclosed in U.S. Pat. No. 4,755,566 and other useful polyamides often referred to as "nylons" are disclosed in U.S. Pat. Nos. 4,732,938, 4,659,760, and 4,315,086. The polyamide used may also be one or more of those referred to as toughened nylons, which are often prepared by blending one or more polyamides with one or more toughening agents such as an elastomer. Examples of these types of materials are given in U.S. Pat. Nos. 4,174,358, 4,474,927, 4,346,194, 4,251,644, 3,884,882, and 4,147,740.

Polyamide can also be a blend of at least two polyamides including blends of at least one partially aromatic polyamide and at least one aliphatic polyamide; at least two partially aromatic polyamides; polyamide 6I, 6T and polyamide 6,6; polyamide 6I,6T and polyamide 6; and polyamide 6I,6T and polyamide MXD6.

The composition can also comprise a stiffness-reducing amount of a softening compound. Such softening compound can be carbon black, polymer such as a polyolefin, inorganic metal compound, fibber, pulp, filler, or combinations of two or more thereof. Examples of polyolefin include polypropylene, polyethylene, or combinations thereof. Polyolefin includes homopolymer or copolymer. Inorganic compound can be any metal compound such as barium sulfate, barium aluminate, barium borate, barium chloride, barium chlorate, barium silicate, magnesium sulfate, magnesium carbonate, calcium carbonate, $TiO_2$, talc ($Mg_3Si_4O_{10}(OH)_3$), clay, nanoclay, or combinations or two or more thereof. Fiber can include chopped fiber, include glass fiber, aramid fiber, carbon fiber, or combinations of two or more thereof. Pulp can include, for example, aramid micropulps (micropulp has a volume average length of from 0.01 to 100 micro-meters). Fillers also include those disclosed below.

The composition can additionally comprise small amounts of additives commonly used and well known in the art including plasticizers, stabilizers including viscosity stabilizers and hydrolytic stabilizers, primary and secondary antioxidants, ultraviolet ray absorbers, anti-static agents, dyes, pigments or other coloring agents, fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. Fillers can be inorganic or organic fillers, such as, for example, calcium carbonate, wood flour, gypsum, talc, mica, carbon black, clay, sand, gravel, calcium aluminate, magnesium carbonate, clay, sodium carbonate, or combinations of two or more thereof. Pigments include both clear pigments such as inorganic siliceous pigments (silica pigments for example) and conventional pigments used in coating compositions. Conventional pigments include metallic oxides such as titanium dioxide, and iron oxide; metal hydroxides; metal flakes such as aluminum flake; chromates such as lead chromate; sulfides; sulfates; carbonates; carbon black; silica; talc; china clay; phthalocyanine blues and greens, organo reds; organo maroons and other organic pigments and dyes. Using a pigment in the blend can alter the color of the blend thereby resulting in colored container that may be desirable for use with cosmetics.

Each of these additives may be present in the compositions in quantities ranging from 0.01 to 30, 0.01 to 10, or 0.01 to 5, weight %. The incorporation of the additives can be carried out by any known process such as, for example, by dry blending, by compounding a mixture of the various constituents, by the conventional masterbatch technique, or the like.

A desired blend is blend of ionomer, such as highly neutralized ionomer, in a continuous polyamide phase even when the volume percent ionomer is greater than that of the polyamide.

The composition can be produced by blending the ionomer with the polyamide, the percent neutralization can be low but high enough that the ethylene-acid copolymer/ionomer has not reached the no-flow state and the viscosity of the ionomer is closer to, or about 50 percent of, that of the nylon (polyamide) at the start of blending. The blending can be melt blended under mixing conditions with further neutralization as the blending occurs. The starting components including any additives may first be combined with one another in what is commonly referred to as a salt and pepper blend. They may also be combined by simultaneous or separate metering or they may be divided and blended in one or more passes into one or more mixing sections of mixing equipment such as extruders, continuous mixers or the like. If more than one feed zone is available, the nylon, the coupling agent and some of the ionomer may be added at the rear most feed port with the remainder of the ionomer being added in a later feed zone. The polymer strands exiting the extruder are preferably quenched in a water bath prior to cutting into pellets. Alternate methods well recognized by one skilled in the art for pelletizing including underwater cutting and air quenching can be used.

A differential scanning calorimeter (DSC) with exothermal cooling can be determined and is a useful indicator of morphology and the sufficiency of mixing conditions for the desired morphology. The DSC with exothermal cooling when using nylon 6 can be about 160° C. to about 180° C. Cooling can be carried out at a rapid rate (e.g., 30° C./min).

The composition can be used to produce an article such as film, sheet, or other molded (shaped) article. Film (including multi-layer film) and corresponding film structures (such as sheet) can be made by any such method as practiced in the art. For example, the film and film structures can be cast, extruded, co-extruded and the like including orientation by various methodologies (e.g., blown film, bubble techniques, mechanical stretching, or lamination). One or more additives discussed above can be present in the film or film layers including the presence of tie layers. The films can have a thickness of from 1 to 2500 μm, with the preferred thickness for many barrier film applications being about 10 to 250 μm thick, preferably 25 to 125 μm thick. The MVTR of these films can be about 10 Kg $m^2$/24 hours or higher for a 50-micron thick continuous film.

The composition can also be used for packaging materials such as containers, pouches and lidding, balloons, labels, tamper-evident bands, or engineering articles such as filaments, tapes and straps.

A molded part can be of various shapes prepared from molten resin by injection molding, extrusion or blow molding, shapes prepared by injection molding process can comprise tube, shell, box shapes or any molded geometry needed. Extrusion can comprise any kind of profile result of the die shape and blow molding can comprise articles such as bottles and tubes.

Articles used in applications including, but not limited to, the containers or portions of containers, such as caps and covers. Examples include jars, bottles, tubes, tray, cup, can, bucket, tub, box, bowl, covers, or combinations of combinations of two or more thereof, and any other shape where the blend may apply.

The following Examples are presented to illustrate various aspects and not meant to be unduly limiting.

EXAMPLES

Experiment 1

Different blends of sodium-neutralized ionomer (Surlyn® PC350; obtained from E. I. du Pont de Nemours and Company, Wilmington, Del., USA) in a pellet form were dry blended and pre-compounded in a twin screw extruder, separately with 30% by weight of one of the following ingredients: talc, calcium carbonate, high density polyethylene (HDPE) and polyamide 6. After compounding of Surlyn® with each one of the ingredients, molded bars were produced by DuPont Engineering Polymers, Tlalnepantla Works, Mexico City, Mexico. Mechanical properties of the molded bars were tested including flexural modulus (ASTM D790) to measure stiffness, gloss at 60° (gloss is defined in ASTM Standard-284 as, n-angular selectivity of reflectance, involving surface reflected light, responsible for the degree to which reflected highlights or images of objects may be superimposed on a surface), melt index (ASTM D1238), stiffness (ASTM D790), and specific gravity (ASTM D792). DuPont internal procedure.

The results showed that the composition with 70% of Surlyn® PC350 and 30% of polyamide 6 was the closest and that the gloss was very close to that of ABS/SAN blend, but not the ABS/SAN stiffness. The results also showed that some dephasing (or phase separation, i.e., the separation of the ionomers from the nylon or polyamide) appeared on the surface of the molded bars. The results are shown in Table 1.

TABLE 1

| Property | ABS/SAN | Composition[1] | Composition[2] | Composition[3] | Composition[4] |
|---|---|---|---|---|---|
| Sp gravity | 1.12 | 1.16 | 1.14 | 0.939 | 0.97 |
| Melt Index (g/10 min) | 5[5] | 4[6] | 3.5[6] | 4.16[6] | 1.2[6] |
| Flexural Modulus (psi) | 350,000 | 91,220 | 89,000 | — | 210,000 |
| Gloss (60° angle) (points) | 84.3 | 71.82 | 77 | 82.76 | 81.6 |

[1] 70% Na-ionomer/30% talc
[2] 70% Na-ionomer/30% $CaCO_3$
[3] 70% Na-ionomer/30% Polyethylene
[4] 70% Na-ionomer/30% nylon 6
[5] 200° C., 5 kg
[6] 190° C., 2.16 kg Stiffness was improved by using nano-fillers which did not jeopardize the glossiness or decrease specific weight.

Molded bars produced from a composition comprising sodium-neutralized ionomer (30 wt % powder), 30 wt % of $CaCO_3$, 35 wt % of HDPE (high density polyethylene), and 35 wt % of nylon 6 were found to have close properties to ABS/SAN.

Experiment 2

Coupling agents were added to blends comprising 70% of Surlyn® PC350 and 30% of polyamide 6 disclosed in Example 1. The coupling agent was zinc-neutralized ionomers. Blends of nylon 6, sodium-neutralized Surlyn®, and zinc-neutralized Surlyn® and the molded bars were produced as disclosed in Example 1. Test of the bars showed that adding the coupling agent eliminated the de-phasing appeared on the surface of the molded bars indicated in Example 1 and no stiffness became the center focus; we were 40% lower than ABS/SAN.

Other compositions tested included composition 1 (55 wt % Sodium-neutralized ionomer (Surlyn® PC350)/10 wt % zinc-neutralized ionomer (Surlyn® 1705-1)/35 wt % polyamide 6); composition 2 (35 wt % Sodium-neutralized ionomer (Surlyn® PC350)/10 wt % zinc-neutralized ionomer (Surlyn® 1705-1)/55 wt % polyamide 6); and composition 3 (35 wt % Sodium-neutralized ionomer (Surlyn® PC2000)/10 wt % zinc-neutralized ionomer (Surlyn® 1705-1)/55 wt % polyamide 6). The results are shown in Table 2.

TABLE 2

| Property | ABS/SAN | Composition 1 | Composition 2 | Composition 3 |
|---|---|---|---|---|
| Sp gravity | 1.12 | 0.97 | 1.03 | 1.04 |
| Melt Index (g/10 min) | 5[1] | 1.2[2] | 0.9[2] | 0.9[2] |
| Flexural Modulus (psi) | 350,000 | 210,000 | 190,000 | 192,000 |
| Gloss (60° angle) (points) | 84.3 | 83 | 81.6 | 82 |

[1] 200° C., 5 kg
[2] 190° C., 2.16 kg

Example 3

In this example, polypropylene and barite were used to produce compositions with sodium-neutralized ionomer (Surlyn® PC350)/5 wt % zinc-neutralized ionomer (Surlyn®1705-1)/80 wt % polyamide 6. The molded bars and tests were the same as disclosed in Example 1. The results are shown in the following table. Table 3 shows tensile strength (ASTM D638), HDT (ASTM D648 at 66 and 264 psi of pressure), and Izod impact (ASTM D256 notched at 23° C.). It was found that polypropylene and barite reduced stiffness to as much as 23% lower than ABS/SAN.

TABLE 3

| Property | ABS/SAN | Composition[1] | Composition[2] | Composition[3] | Composition[4] |
|---|---|---|---|---|---|
| Specific Gravity | 1.12 | 1.08 | 1.15 | 1.65 | 1.14 |
| Melt Index | 5[5] | 0.05[6]; 15.12[7] | 2.5 | 3.4 | 2.65 |
| Flexural Modulus (psi) | 350000 | 267000 | 204180 | 163253 | 221356 |
| Gloss (60° angle) (points) | 84.3 | 83 | 70 | 75 | 76 |
| Tensile Strength (psi) | | 9265 | | | |
| HDT (264 psi) (° C.) | | 63 | | | |
| Izod Impact notched (ft-pb/in) | | 2.2 | | | |

[1] 15% Na-ionomer/5% Zn-ionomer/80% nylon 6
[2] 20% Na-ionomer/40% polypropylene/40% barite
[3] 40% Na-ionomer/60% barite
[4] 10% Na-ionomer/50% polypropylene/40% barite
[5] 200° C., 5 kg
[6] 190° C., 2.16 kg
[7] 235° C., 2.16 kg

The invention claimed is:

1. A composition comprising or produced from an ionomer, a polyamide a polyolefin, and a softening compound wherein the ionomer is a blend of sodium-neutralized ionomer and zinc-neutralized ionomer; the softening compound includes carbon black, magnesium sulfate, magnesium carbonate, $TiO_2$, chopped fiber, carbon fiber, aramide micropulps, barium sulfate, barium aluminate, barium borate, barium chloride, barium chlorate, barium silicate, or combinations of two or more thereof.

2. The composition of claim 1 wherein the composition comprises about 20% of the ionomer and about 80% of the polyamide.

3. The composition of claim 2 wherein the blend comprises 75% of the sodium-neutralized ionomer and 25% of zinc-neutralized ionomer.

4. The composition of claim 3 wherein the polyamide is polyamide 6.

5. The composition of claim 2 wherein the polyolefin includes polypropylene and/or polyethylene and the softening compound includes carbon black or barium sulfate.

6. The composition of claim 5 wherein the blend comprises 75% of the sodium-neutralized ionomer and 25% of zinc-neutralized ionomer.

7. The composition of claim 5 wherein the polyamide is polyamide 6.

8. The composition of claim 7 wherein the polyolefin includes polypropylene and the softening compound includes barium sulfate.

9. The composition of claim 1 wherein the blend comprises 75% of the sodium-neutralized ionomer and 25% of zinc-neutralized ionomer and the softening compound is present in the composition, based on the weight of the composition, from about 0.01 to about 30%.

10. The composition of claim 1 wherein the softening compound is present in the composition, based on the weight of the composition, from about 0.01 to about 30%.

11. The composition of claim 10 wherein the blend comprises 75% of the sodium-neutralized ionomer and 25% of zinc-neutralized ionomer.

12. A composition comprising or produced from about 2 to about 10% of a zinc-neutralized ionomer, about 15 to about 25% of a sodium-neutralized ionomer, about 75 to about 85% of a polyamide, all based on the total weight of the composition a polyolefin, and a softening compound wherein the softening compound includes magnesium sulfate, magnesium carbonate, $TiO_2$, chopped fiber, carbon fiber, aramide micropulps, barium sulfate, barium aluminate, barium borate, barium chloride, barium chlorate, barium silicate, or combinations of two or more thereof; and the softening compound is present in the composition, based on the weight of the composition, from about 0.01 to about 30%.

13. The composition of claim 12 wherein the zinc-neutralized ionomer is present in the composition at about 5%, the sodium-neutralized ionomer is present in the composition at about 20%, and the polyamide is present in the composition at about 80%.

14. The composition of claim 13 wherein the polyamide is polyamide 6; the ionomer of each of the zinc-neutralized ionomer and the sodium-neutralized ionomer is an E/X/Y copolymer; E is derived from ethylene; X is an $\alpha,\beta$-ethylenically unsaturated carboxylic acid; X is present in 3 to 30 weight % of the copolymer; and Y is a comonomer including maleic anhydride, ethyl hydrogen maleate, itaconic acid, CO, glycidyl (meth)acrylic acid or its alkyl ester, or combinations of two or more thereof and is present in 0 to 30 weight % of the copolymer.

15. The composition of claim 14 wherein the polyolefin includes polypropylene and/or polyethylene and the softening compound is carbon black.

16. The composition of claim 14 wherein the polyolefin includes polypropylene and the softening compound is barium sulfate.

17. An article comprising a composition recited in claim 12 wherein the article includes film or shaped article.

18. The article of claim 17 wherein the article includes container, cover of the container, or cap of the container, the zinc-neutralized ionomer is present in the composition at about 5%, the sodium-neutralized ionomer is present in the composition at about 15%, and the polyamide is polyamide 6 and is present in the composition at about 80%.

19. The article of claim 18 wherein article includes cap of the softening compound is barium sulfate.

20. The article of claim 17 wherein the polyamide is polyamide 6.

* * * * *